J. P. KELLY.
ROD PACKING FOR AIR PUMPS.
APPLICATION FILED APR. 23, 1915.
1,173,808.
Patented Feb. 29, 1916.
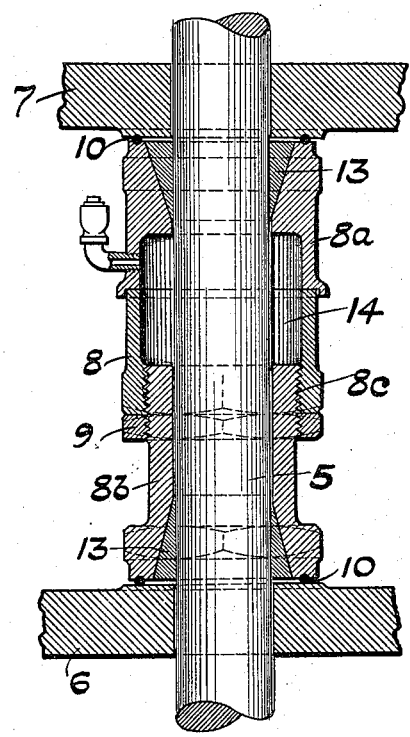
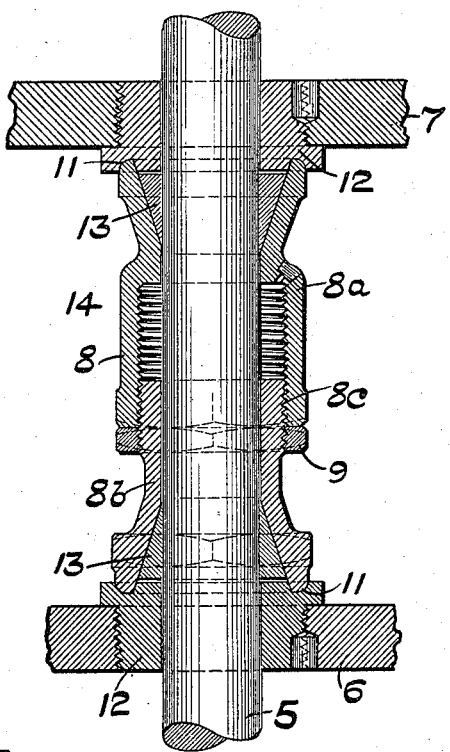
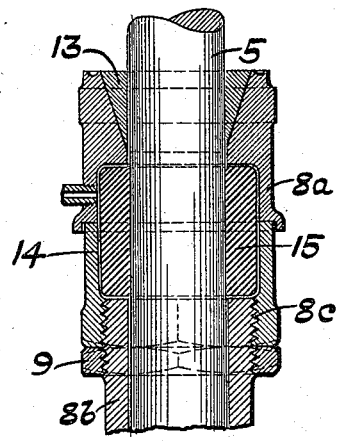
INVENTOR
John P. Kelly
by Edward A. Wright.
Atty.

UNITED STATES PATENT OFFICE.

JOHN P. KELLY, OF YONKERS, NEW YORK.

ROD-PACKING FOR AIR-PUMPS.

1,173,808.

Specification of Letters Patent. Patented Feb. 29, 1916.

Application filed April 23, 1915. Serial No. 23,326.

*To all whom it may concern:*

Be it known that I, JOHN P. KELLY, a citizen of the United States, residing at Yonkers, in the county of Westchester and State of New York, have invented a certain new and useful Improvement in Rod-Packing for Air-Pumps, of which improvement the following is a specification.

This invention relates to packing for piston rods, and more particularly to rods of steam driven air pumps, such as used in air brake systems, in which the pistons are directly connected by the rod; the object being to provide an improved protective casing or sleeve for the rod between the cylinder heads, which may readily be adjusted in its proper position, and containing an improved packing whereby stuffing boxes are eliminated and the fluid from one cylinder is prevented from leaking into the other.

In the accompanying drawing: Figure 1 is a vertical section along the rod between the cylinder heads, and showing one form of my improvement; Fig. 2, a similar section showing a modification; and Fig. 3, a similar view showing still another modification.

According to the construction shown, the piston rod, 5, passes through openings in the air cylinder head, 6, and the steam cylinder head, 7, between which is located the improved collapsible casing or sleeve, 8, surrounding the rod and formed in sections, $8^a$ and $8^b$, having a threaded connection, $8^c$, and a lock nut, 9. The ends of the sleeve sections are formed to make a tight joint with the respective cylinder heads either by means of copper wire joint packing, 10, as shown in Fig. 1, or by the rounded edges of the sleeve sections fitting corresponding grooves, 11, in the heads, or in the bushings, 12, secured in said heads around the rod, as shown in Fig. 2.

The ends of the sleeve sections adjacent to the cylinder heads are provided with flaring recesses in which are located the tapered or frusto-conical packing rings, 13, surrounding the rod, and adapted to be forced into the recesses by the fluid pressure from the cylinders. A sectional metal packing ring is preferably employed for this purpose, although other forms may be used if desired. At the point at which one of the sleeve sections is screwed into the other there is formed a chamber, 14, around the rod, for containing waste or wicking forming a swab for lubricating the rod. An oil cup may also be connected with this chamber. If preferred, a sectional metal packing ring, 15, may be located in this chamber, as indicated in Fig. 3. If desired, the sleeve section, $8^a$, may be divided into two or more parts, as shown in Fig. 1.

When the pump is in operation, the high pressure of fluid occurs in the adjoining ends of the steam cylinder and the air pump cylinder at the same part of the stroke of the piston so that both packing rings, 13, 13, are forced into their tapered recesses in the sleeve simultaneously, thereby making tight joints with the rod and the sleeve and preventing leakage of fluid from the cylinder having the higher pressure, which is usually the steam cylinder, into the other. If it be desired to remove one or more packing rings for repairs or renewals, access to the same is readily obtained by loosening the lock nut and screwing the sections of the sleeve one within the other, to collapse the same and then slide the sleeve along the rod to expose the packing rings. By screwing the sections in the opposite direction, the sleeve may be extended to make tight joints at its ends with the respective cylinder heads.

Having now described my invention, what I claim as new and desire to secure by Letters Patent is:

1. In a rod packing for direct connected steam pumps, the combination of a sectional sleeve surrounding the rod between the cylinder heads and having recesses, packing rings located around the rod in said recesses and adapted to be pressed tight by fluid pressure from the respective cylinders, and means for making tight joints between the ends of said sleeve and the cylinder heads independently of said packing.

2. In a rod packing for direct connected steam pumps, the combination with a sectional sleeve surrounding the rod between the cylinder heads and having flaring recesses at its opposite ends, conical packing rings located in said recesses and adapted to be pressed tight by fluid pressure, and means for making tight joints between the ends of said sleeve and the cylinder heads independently of said packing.

3. In a rod packing for direct connected steam pumps, a sectional sleeve surrounding the rod between the cylinder heads, packing for said rod, means for extending said sections to make tight joints at its ends with the heads independently of said packing, said sleeve having an intermediate chamber for containing wicking to lubricate the rod.

4. In a rod packing for direct connected steam pumps, the combination of a collapsible sleeve surrounding the rod from one cylinder head to the other and formed in sections having screw threaded connections with each other, packing for the rod, and means for making tight joints between the ends of the sleeve and the cylinder heads independently of said packing.

5. In a rod packing for direct connected steam pumps, the combination of a collapsible sleeve surrounding the rod from one cylinder head to the other and formed in sections having screw threaded connections with each other, said sleeve having flaring recesses at its opposite ends, tapered metallic packing rings located in said recesses, and means for making tight joints between the ends of the sleeve and the cylinder heads independently of said packing.

JOHN P. KELLY.

Witnesses:
EDWARD A. WRIGHT,
A. S. FOWLER.

Copies of this patent may be obtained for five cents each, by addressing the "Commissioner of Patents, Washington, D. C."